July 21, 1970    K. E. MORAN ET AL    3,521,162
FREQUENCY ANALYZING DEVICE AND METHOD USING VIBRATING REEDS
Filed Nov. 21, 1966

INVENTORS.
KEVIN E. MORAN
ROBERT M. HAINES
BY *William S. Brown*
ATTORNEY.

United States Patent Office 3,521,162
Patented July 21, 1970

3,521,162
FREQUENCY ANALYZING DEVICE AND METHOD USING VIBRATING REEDS
Kevin E. Moran, Cumberland, Md., and Robert M. Haines, Placentia, Calif., assignors to Union Oil Company of California, Los Angeles, Calif., a corporation of California
Filed Nov. 21, 1966, Ser. No. 595,928
Int. Cl. G01r 23/16, 27/02
U.S. Cl. 324—77                                  5 Claims

ABSTRACT OF THE DISCLOSURE

The frequencies and amplitudes comprising a multi-frequency energy source are segregated by transmitting the energy to a plurality of reeds having separate and discrete resonance frequencies and positioned in a medium exhibiting shear-dependent impedance to the passage of electrical current and measuring the change in current passing through an electric circuit connected across a shear-responsive fluid subjected to shearing by each vibrating reed.

This invention relates to method and apparatus for analyzing the frequency of a multi-frequency energy source for the purpose of identifying the different frequencies of which the source is composed and of determining the amplitude of each of such frequencies.

It is known in the prior art to employ resonant reeds which can be excited by an electromagnetic source when the frequency of the excitation current corresponds to the natural mechanical resonance of the reed. The vibrating reed is curved by the excitation current to produce a signal either by intermittently contacting an electric terminal enclosing the circuit or by interrupting the radiant energy from a light source on a photoelectric light detecting and transducing device such as that disclosed in the patent to Inderwiesen 3,093,743. Our invention is capable of resolving the frequencies of a multiple frequency energy source as well as determining the amplitude of each of such frequencies. While our method and apparatus is adapted to various types of electrical performing functions including switch frequencies, selected filtering frequencies, and numerous control applications, it is particularly adapted for analyzing seismic magnetic tape recordings. In this way not only can the nature of the sound waves recorded be determined but their relative amplitudes can be determined, too.

Figure 1:
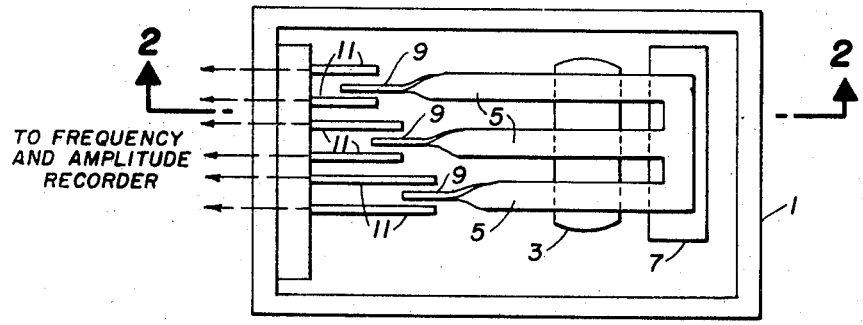
Figure 2:
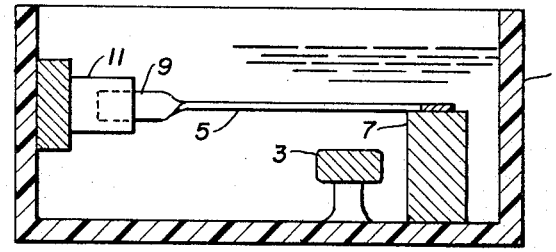
Figure 3:
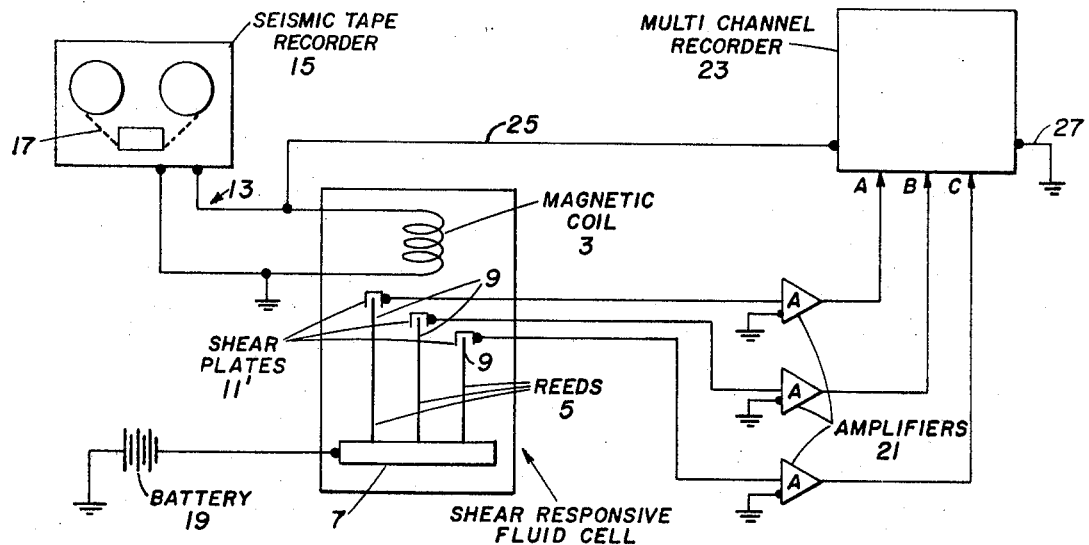

It is an object of our invention to provide a method and apparatus for resolving a multi-frequency energy source into separate frequencies. It is a further object to determine the amplitude of the separate frequencies in a complex energy source. Another object of the invention is to provide a method and apparatus for analyzing a complex energy source to determine the frequency of the various vibrations without the necessity of relying on a make and break contact, thereby avoiding arcing with its attendant extraneous signal-producing characteristic and its interference with current flow. Other objects of the invention will become apparent from the following description and accompanying drawings, of which FIG. 1 is a plan view of a portion of the apparatus of a shear-responsive fluid cell of our invention; FIG. 2 is a diagrammatic horizontal view of the apparatus shown in FIG. 1; and FIG. 3 is a schematic view of the apparatus in accordance with our invention.

Referring to the drawings, numeral 1 indicates a rectangular receptacle, preferably made of nonconductive material such as any of the well known plastics, or the receptacle may be made of metal and the terminals insulated therefrom. Mounted on the bottom of the receptacle is an electromagnetic coil 3. A plurality of vibratory reeds 5 are mounted at one end of conductive post 7 with the free ends 9 extended horizontally between pairs of shear plates 11. Shear plates 11 are mounted in vertical position in the receptacle 1 and if the receptacle is conductive, the shear plates and post 7 are insulated therefrom. The free end of each reed is located between a pair of plates and is preferably spaced from the adjacent walls thereof at a distance of approximately 0.010 inch. The reeds 5 are adapted to vibrate in a vertical direction. Each pair of shear plates is connected to an electric output circuit containing an electric power source and a current measuring and recording device, such as a recording galvanometer. The shear responsive fluid cell is filled above the level of the shear plates 11 with any suitable shear responsive fluid as, for example, a suspension of finely divided silica in petroleum oil containing a fluidizer to enhance its physical and electrical properties. As used herein "shear responsive fluid" means a composition in liquid or semi-liquid state which exhibits a change in electrical conductivity and/or resistance, or which generates an electric potential upon being subjected to mechanical shear.

Suitable shear responsive fluids are given in the following table.

TABLE—SHEAR RESPONSIVE FLUID COMPOSITIONS

| Composition, weight percent | Fluid A | Fluid B |
|---|---|---|
| Silica (dry basis) | 47.20 | 48.48 |
| Water (on silica) | 3.39 | 6.18 |
| Glycerolmonooleate | 5.56 | 17.75 |
| 85/100 vis. neutral oil | | 27.59 |
| Kremol 40 oil | 29.69 | |
| Amine 220 | 10.12 | |
| Ethylene glycol | 4.04 | |

The neutral lubricating oil had a viscosity of 79.3 SUS at 100° F. and weighed 0.845 g./cc. The Kremol 40 is a proprietary mineral oil product of Sherwood Refining Co. having a viscosity of 43 SUS at 100° F. and weighing 0.816 g./cc. Amine 220 is a proprietary product of Union Carbide Chemicals Corp., comprising 90% 1-hydroxy ethyl-2-heptadecylimidazoline and 10% impurities as the oleic acid amide and N-aminoethylethanolamine. The ethylene glycol had a boiling point of 195–197° C.

Both fluids A and B were prepared with the same type of silica, but the pretreatment of the silica varied. The silica is a known proprietary product designated "Silica PA–400, Specially Ground" and had a surface area of 745 m.$^2$/g., a pour volume of 0.30 cc./g., an average particle size of 1–2 microns and a total water content of 6.6 wt. percent (percent volatiles at 1000° C., for 3 hours). The silica surface had six silanol groups (SiOH) per square millimicron (m$\mu^2$) of surface area with about 0.5 wt. percent of physically adsorbed or "free" water. This silica was used as is in the preparation of fluid A.

A sample of the above silica was treated with water-saturated atmosphere until the total water content was 21–22 wt. percent. The moist silica was sealed and stored at room temperature for a minimum of two weeks and then dehydrated at 110–115° C. in a covered container to a total water content of 11.3 wt. percent. Such treatment results in a surface with 8 silanol groups/m$\mu^2$ and 3.1 wt. percent adsorbed free water. This silica was used to prepare fluid B.

The electromagnetic coil 3 is energized by means of a suitable circuit containing a multi-frequency alternating current source.

Referring more particularly to FIG. 3, the shear responsive fluid cell 1 contains the reeds 5, the free ends of which vibrate parallel to the quadrangular-shaped shear plates 11'. Magnetic coil 3 is energized by circuit 13 which is connected to the output of a recorder 15 for playing back a magnetic seismic tape 17. In this modification the reeds 5 and the shear plates 11' are conductive and are connected in series in a circuit including battery 19, amplifiers 21 and multi-channel recorder 23. Each shear plate associated with a vibratory reed is connected in a separate circuit through an amplifier to the recorder. The recorder may be of the galvanometer type, such as a Minneapolis-Honeywell Visicorder. The recorder records the amplitude with which each reed vibrates since the current flowing in each circuit is a function of the frequency and of the amplitude with which the reed vibrates. The output from the seismic tape recorder 15 is connected to the multi-channel recorder 23 by means of lines 25 and 27 and is recorded along with the individual component frequencies analyzed by the shear responsive fluid cell. It will be seen that the shear responsive fluid cell acts as a filter for the output of the seismic tape recorder.

It will be apparent that the invention may be used for the same purposes set forth in Pat. No. 3,093,743, such as switching, filtering and control of the frequency of an oscillator. For example, in the circuits described in FIGS. 2 through 6 of the aforesaid patent, the shear responsive fluid cell of the present invention can be used in place of the photosensitive transducer device.

Since the conductivity of shear responsive fluid is highly sensitive to the rate of shear, the device of this invention is capable of responding substantially instantaneously to excitation of the reeds and is capable of making differentiations between small differences in frequency and very small differences in amplitude. The reeds are never in contact with the shear plates but merely change the impedance to passage of current between the plates in inverse relation to the vibrational amplitude of the reed.

The embodiments of the invention in which an exclusive property or privilege is claimed are defined as follows:

1. A device for analyzing energy of multiple frequency and variable current comprising a body of shear-responsive fluid, a plurality of vibratory reeds mounted in spaced relation in said fluid, means for transmitting said multiple frequency energy to said reeds to produce vibration of a free end thereof when the frequencies transmitted to said reeds correspond to the resonant frequencies of said reeds, separate shear plates, in contact with said fluid, located adjacent to the free end of but spaced from each reed, at least one shear plate adjacent each such end being in series electric communication with said fluid intermediate said plate and said adjacent reed, an electrical power source and current measuring means in electrical series communication with said intermediate fluid and each of said plates for measuring current flow therebetween and means for simultaneously monitoring said current flow between each of said plates and said fluid.

2. A device in accordance with claim 1 in which said means for transmitting said multiple frequency energy includes a magnetic coil.

3. A device in accordance with claim 1 in which the means for measuring changes in flow of current is a multi-channel recording galvanometer.

4. The method of analyzing the frequencies and amplitudes of a multi-frequency variable current energy source comprising feeding energy from said source in the form of electric current to a magnetic coil, simultaneously exciting a plurality of vibratory reeds of different resonant frequencies corresponding to the frequencies of said source by means of the magnetic output of said coil, shearing a shear-responsive fluid by means of the vibrating reeds, simultaneously measuring the change in current flowing through electric circuits connected across the shear-responsive fluid subjected to shearing by each such reed and simultaneously recording the current variation in each of said circuits.

5. A method in accordance with claim 4 in which the change in resistance of said shear-responsive fluid due to shearing of said fluid by each said vibratory reed is separately measured.

References Cited

UNITED STATES PATENTS

| 3,309,915 | 3/1967 | McEuen et al. | 73—71.2 |
|---|---|---|---|
| 2,936,416 | 5/1960 | Hurvitz. | |
| 3,213,197 | 10/1965 | Hawkins. | |
| 3,361,966 | 1/1968 | Gerber et al. | |

EDWARD E. KUBASIEWICZ, Primary Examiner